United States Patent
Leonard et al.

(10) Patent No.: US 9,264,338 B1
(45) Date of Patent: Feb. 16, 2016

(54) DETECTING UPSET CONDITIONS IN APPLICATION INSTANCES

(71) Applicant: Sprint Communications Company L.P., Overland Park, KS (US)

(72) Inventors: Mark D. Leonard, Olathe, KS (US); Jennifer Mae Carlton, Merriam, KS (US)

(73) Assignee: Sprint Communications Company L.P., Overland Park, KS (US)

(*) Notice: Subject to any disclaimer, the term of this patent is extended or adjusted under 35 U.S.C. 154(b) by 372 days.

(21) Appl. No.: 13/858,528

(22) Filed: Apr. 8, 2013

(51) Int. Cl.
*G06F 15/173* (2006.01)
*H04L 12/26* (2006.01)

(52) U.S. Cl.
CPC .................................... *H04L 43/10* (2013.01)

(58) Field of Classification Search
USPC ......................................................... 709/224
See application file for complete search history.

(56) References Cited

U.S. PATENT DOCUMENTS

| | | | |
|---|---|---|---|
| 5,856,978 A * | 1/1999 | Anthias .................... | H04L 51/28 370/412 |
| 5,937,205 A | 8/1999 | Mattson et al. | |
| 6,035,424 A | 3/2000 | Freerksen et al. | |
| 6,182,109 B1 | 1/2001 | Sharma et al. | |
| 6,363,503 B1 * | 3/2002 | Clauss et al. ..................... | 714/57 |
| 6,434,605 B1 * | 8/2002 | Faulkner et al. .............. | 709/213 |
| 6,496,516 B1 | 12/2002 | Dabecki et al. | |
| 6,760,580 B2 | 7/2004 | Robinson et al. | |
| 7,127,517 B2 | 10/2006 | Heisig et al. | |
| 7,350,212 B2 | 3/2008 | Lambert et al. | |
| 7,725,577 B2 | 5/2010 | Nochta et al. | |
| 7,746,771 B1 * | 6/2010 | Croak ................. | H04L 41/0681 370/229 |
| 7,787,370 B1 * | 8/2010 | Aweya ................... | H04L 45/245 370/230 |
| 7,873,991 B1 | 1/2011 | Attwood et al. | |
| 7,934,028 B1 * | 4/2011 | Leonard .............. | H04L 41/0609 710/15 |
| 8,127,305 B1 * | 2/2012 | Leonard .................. | G06F 9/546 709/226 |
| 8,156,374 B1 | 4/2012 | Ford et al. | |
| 8,185,912 B1 * | 5/2012 | Leonard .................. | G06F 9/546 709/226 |
| 8,196,151 B1 * | 6/2012 | Leonard .................... | G06F 3/00 719/314 |
| 8,205,202 B1 * | 6/2012 | Leonard ................ | G06F 9/5055 718/100 |
| 8,214,846 B1 * | 7/2012 | Leonard .............. | G06F 11/0709 709/213 |
| 8,332,537 B1 * | 12/2012 | Leonard .................. | H04L 51/14 709/206 |

(Continued)

OTHER PUBLICATIONS

Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).

(Continued)

*Primary Examiner* — Alicia Baturay (57) ABSTRACT

A method, system and a computer-readable media for automatically detecting problems in an application instance are provided. The application instances are responsible for communicating messages accumulating within a queue to a destination. The destination may be a computer application, another queue, or some other computing component. In one embodiment, the queue and application instances are part of a messaging-middleware environment. An embodiment of the present invention monitors the performance of individual application instances and detects an upset condition by comparing the present performance with a baseline performance or normal performance range. The application instance's message transfer rate may be used to measure both present and normal performance.

15 Claims, 8 Drawing Sheets

(56) References Cited

U.S. PATENT DOCUMENTS

| | | | |
|---|---|---|---|
| 8,347,315 B1* | 1/2013 | Leonard | H04L 67/34 707/999.1 |
| 8,424,019 B1* | 4/2013 | Leonard | G06F 9/546 719/314 |
| 8,464,276 B1* | 6/2013 | Leonard | G06F 9/546 719/313 |
| 8,483,234 B2* | 7/2013 | Koktan | H04L 43/16 370/413 |
| 8,510,473 B1* | 8/2013 | Leonard | H04L 67/2823 709/232 |
| 8,645,970 B1* | 2/2014 | Leonard | G06F 11/0709 700/108 |
| 8,767,547 B2* | 7/2014 | Adams | H04L 12/5695 370/230 |
| 8,769,550 B1* | 7/2014 | Leonard | G06F 3/00 718/102 |
| 8,799,926 B1* | 8/2014 | Leonard | G06F 11/076 709/248 |
| 8,898,520 B1* | 11/2014 | Ford | G06F 11/00 714/15 |
| 8,959,530 B1* | 2/2015 | Leonard | G06F 9/546 718/102 |
| 8,977,595 B1* | 3/2015 | Leonard | G06F 11/14 707/640 |
| 9,038,093 B1* | 5/2015 | Leonard | G06F 9/546 719/314 |
| 2001/0055313 A1 | 12/2001 | Yin et al. | |
| 2002/0064126 A1 | 5/2002 | Bhattal et al. | |
| 2002/0170954 A1 | 11/2002 | Zingher et al. | |
| 2003/0050956 A1 | 3/2003 | Janssen et al. | |
| 2003/0061220 A1 | 3/2003 | Ibrahim et al. | |
| 2003/0110249 A1 | 6/2003 | Buus et al. | |
| 2003/0156547 A1* | 8/2003 | Peleg | H04L 29/06 370/252 |
| 2003/0177412 A1 | 9/2003 | Todd | |
| 2003/0182464 A1 | 9/2003 | Hamilton et al. | |
| 2003/0195983 A1* | 10/2003 | Krause | H04L 47/12 709/238 |
| 2004/0139166 A1* | 7/2004 | Collison | 709/207 |
| 2004/0176864 A1 | 9/2004 | Cocco et al. | |
| 2004/0215998 A1 | 10/2004 | Buxton et al. | |
| 2005/0038824 A1 | 2/2005 | Kenntner et al. | |
| 2005/0089053 A1 | 4/2005 | Zhu | |
| 2005/0125464 A1 | 6/2005 | Kline | |
| 2005/0183093 A1 | 8/2005 | Pope et al. | |
| 2005/0228900 A1 | 10/2005 | Stuart et al. | |
| 2006/0129684 A1 | 6/2006 | Datta | |
| 2006/0146711 A1 | 7/2006 | Anbarani | |
| 2006/0177069 A1 | 8/2006 | Critchley et al. | |
| 2006/0212367 A1 | 9/2006 | Gross | |
| 2007/0112921 A1 | 5/2007 | Lunt et al. | |
| 2007/0168874 A1 | 7/2007 | Kloeffer et al. | |
| 2007/0288157 A1 | 12/2007 | Peterman | |
| 2007/0294708 A1 | 12/2007 | Kline | |
| 2008/0163249 A1 | 7/2008 | Garza et al. | |
| 2008/0267203 A1 | 10/2008 | Curcio et al. | |
| 2008/0301709 A1 | 12/2008 | Ban | |
| 2009/0180380 A1 | 7/2009 | Prabhakar et al. | |
| 2010/0162265 A1 | 6/2010 | Heddes | |
| 2010/0223491 A1 | 9/2010 | Ladd et al. | |
| 2011/0041132 A1 | 2/2011 | Andrade et al. | |
| 2011/0265098 A1 | 10/2011 | Dozsa et al. | |
| 2011/0289165 A1 | 11/2011 | Hobson et al. | |
| 2012/0096113 A1 | 4/2012 | Ladd et al. | |
| 2012/0260261 A1 | 10/2012 | Tillier | |
| 2012/0291034 A1 | 11/2012 | Kamath et al. | |
| 2014/0181409 A1* | 6/2014 | Manula et al. | 711/133 |

OTHER PUBLICATIONS

Ben Mann, Worldwide Product Manager, Providing a backbone for connectivity with SOA Messaging, IBM WebSphere.software, Service oriented Architecture solutions, White paper, Updated: Jun. 2009, 32 pages, ibm.com/webspheremq, Copyright IBM Corporation 2009, Produced in the United States of America 03-07.A16.

IBM, Websphere MQ—Intercommunication Version 6.0 2005, IBM, pp. 1-573.

Triantos, Nick, Queue Depth, Apr. 30th, 2006, storagefoo.blogspot.com [online, accessed on Dec. 17th, 2010], URL; http://storagefoo.blogspot.com/2006/04/queue-depths.html.

Duchovni, Victor, "Postfix Bottleneck Analysis", Dec. 25, 2006, 9 pages.

Venema, Wietse, "QMGR(8)", Oct. 17, 2007, 6 pages.

Duchovni, Victor, "QSHAPE(1)", Oct 27, 2007, 2 pages.

"Open VMS System Manager's Manual", Mar. 2001, Compaq.

Notice of Allowance, dated Sep. 20, 2013 U.S. Appl. No. 11/854,342, 24 pages.

Final Office Action mailed Jan. 10, 2014 in U.S. Appl. No. 12/346,119, 31 pages.

Notice of Allowance dated Feb. 18, 2014 U.S. Appl. No. 13/659,465, 47 pages.

Ogasawara, Dynamic Thread Count Adaptation for Multiple Services in SMP Environments, IBM Tokyo Research Lab, Kanagawa, Japan, 2008 IEEE International Conference on Web Services, 8 pages.

Notice of Allowance dated Mar. 21, 2014 in U.S. Appl. No. 12/346,119, 9 pages.

Notice of Allowance dated Mar. 23, 2015 in U.S. Appl. No. 13/585,244, 11 pages.

* cited by examiner

DETECTING UPSET CONDITIONS IN APPLICATION INSTANCES

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present invention is defined by the claims below. Embodiments of the present invention detect problems in an application instance. The application instances are responsible for communicating messages accumulating within a queue to a destination. The destination may be a computer application, another queue, or some other computing component. In one embodiment, the queue and application instances are part of a messaging-middleware environment. An embodiment of the present invention monitors the performance of individual application instances and detects an upset condition by comparing the present performance with a baseline performance or normal performance range. The application instance's message transfer rate may be used to measure both present and normal performance.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The present invention will be better understood from the detailed description provided below and from the accompanying drawings of various embodiments of the invention, which describe, for example, generating an alarm based on the number of messages entering and leaving a queue during a period of time. The detailed description and drawings, however, should not be read to limit the invention to the specific embodiments. Rather, these specifics are provided for explanatory purposes that help the invention to be better understood.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Embodiments of the present invention detect problems in an application instance. The problems may be described herein as an upset condition. The application instances are responsible for communicating messages accumulating within a queue to a destination. The destination may be a computer application, another queue, or some other computing component. In one embodiment, the queue and application instances are part of a messaging-middleware environment. A messaging-middleware environment will be described in more detail with reference to FIG. 2.

Embodiments of the present invention monitor the performance of individual application instances and detect an upset condition by comparing the present performance with a baseline performance or normal performance range. The application instance's message transfer rate may be used to measure performance.

Initially, a normal performance range is determined. The normal performance range may be determined for an individual application instance by analyzing the performance of the individual application instance over time during normal conditions. As mentioned, one measure of performance is the amount of messages communicated during a unit of time. For example, the messages communicated per second could be used as a measure of performance. Thus, the baseline or normal range could be an average transfer rate for the application instance measured over time.

In one embodiment, the performance of multiple application instances is measured to determine a normal performance for the application instance. In some embodiments, queues will have multiple application instances communicating messages from the queue to a destination(s). Each application instance is a copy of the same software program or code. Each instance may have its own identification information, but all instances perform the same function.

The normal rate may be determined by measuring the message throughput of the queue and dividing the throughput by the number of active application instances during that time period. Thus, if one hundred messages were communicated through the queue within a second, and five application instances were running, then the average transfer rate would be twenty messages per second for an individual application instance. Monitoring the queue throughput eliminates the need to monitor the individual application instances for the purpose of establishing a normal performance. A range of normal transfer rates may be established by analyzing the performance of the application instances or the queue throughput over different periods of time.

As mentioned, the present performance is compared against the normal performance and an upset event triggered upon a difference between the two reaching a threshold.

In one embodiment, the upset event is an alarm that communicates the identification of the application instance in which low throughput rates were detected. In one embodiment, the alarm is only sent after initial troubleshooting is completed and determined that there are messages within the queue that are available for communication and that the other applications are not also having difficulties. Further, other alarm records could be checked to see if they relate to a problem that could cause throughput problems for an application instance.

As stated above, the present invention may be embodied as, among other things, a method, system, or computer-program product that is implemented as software, hardware or a combination of the two, or as computer-readable media having computer-usable instructions embodied thereon. In these embodiments, the exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Computer-readable media can be any available media that can be accessed by computing device 100 and includes both volatile and nonvolatile media, removable and nonremovable media. By way of example, and not limitation, computer-readable media may comprise computer-storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Figure 1:
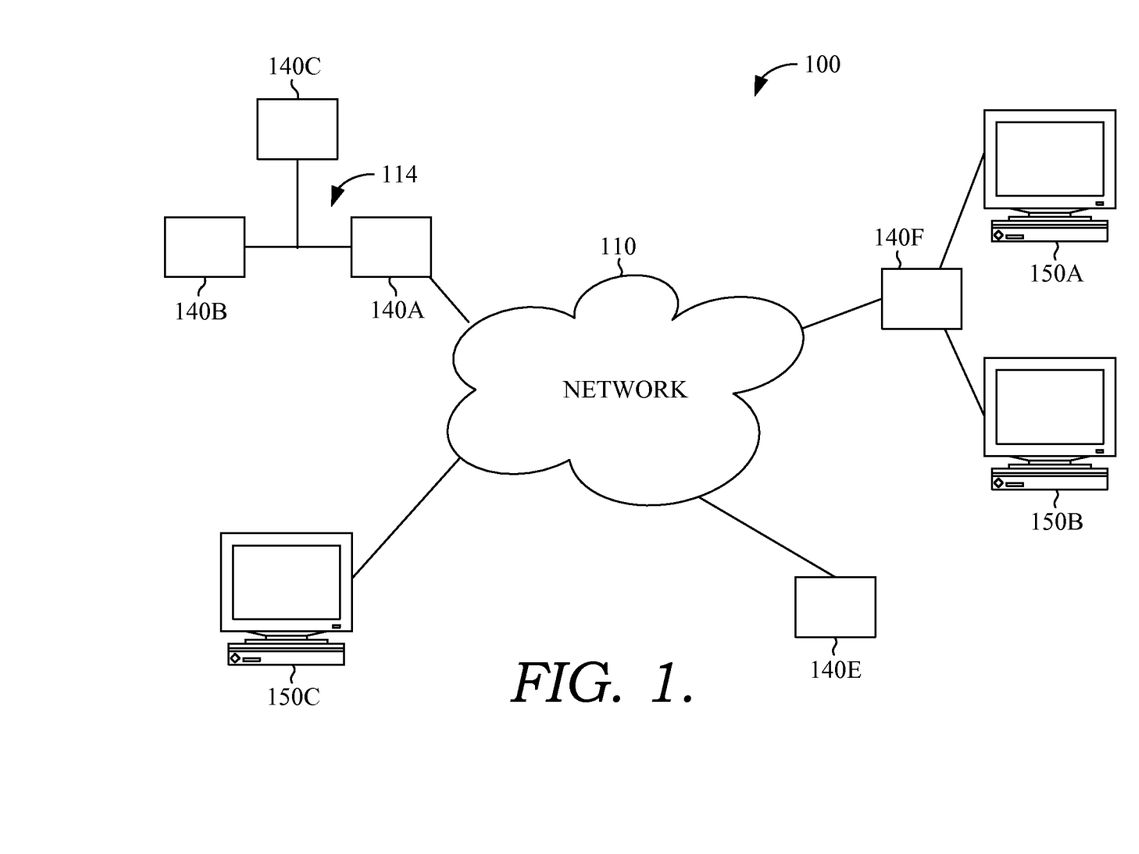
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, and 140C, which communicate with each other via LAN 114, and servers 140E and 140F, which communicate with each other via network 110. Operating environment 100 is merely an example of one suitable networking environment and is not intended to suggest any limitation as to the scope of use or functionality of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, an internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement the present invention.

The operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
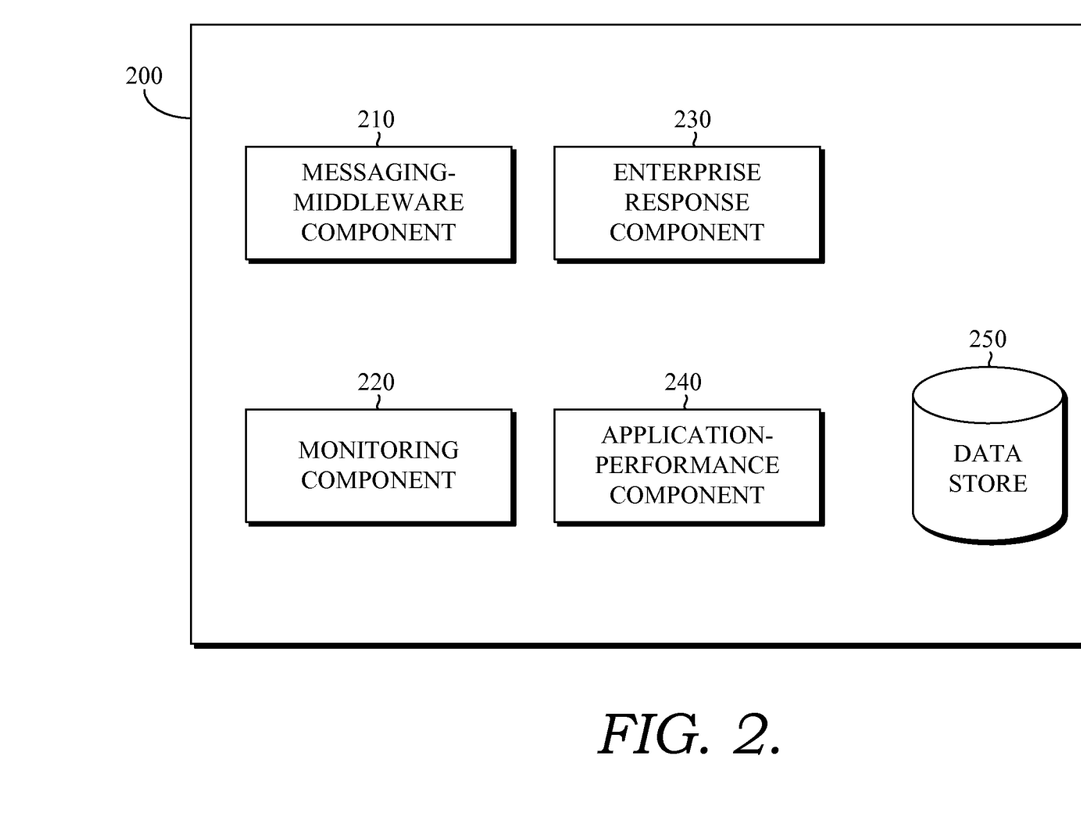
FIG. 2 is a drawing of an exemplary computing system architecture in which an embodiment of the present invention may be practiced.

Turning now to FIG. 2, a block diagram depicts an exemplary computing system architecture 200 suitable for automatically generating an alarm based on the number of messages transmitted by an application instance during a time period. The exemplary computing system architecture 200 shown in FIG. 2 is merely an example and is not intended to suggest any limitation as to the scope of the use or functionality of the present invention. Neither should the exemplary computing system architecture 200 be interpreted as having any dependency or requirement related to any single component or combination of components illustrated therein.

Exemplary computing system architecture 200 includes messaging-middleware component 210, monitoring component 220, enterprise-response component 230, application-performance component 240, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging-middleware applications (a.k. a message-oriented middleware) include IBM's WebSphere® Mqueue (formerly Mqueue Series®), Fiorano's Mqueue, Oracle Advanced Queuing (AQ), and Microsoft's MSMqueue. The messaging-middleware component 210 can be any application that uses queues to transfer messages from one application to another. For example, information from application A is formed into one or more messages. These messages from application A are placed in a sending queue, within the messaging-middleware component 210, and transferred by the messaging-middleware component 210 into a receiving queue within the messaging-middleware component 210. Program B then retrieves the messages from the receiving queue. The messages are transmitted through channels within the messaging-middleware component. In this example, programs A and B could be located on any computing device communicatively coupled to the one or more computers on which the messaging-middleware component 210 resides. A messaging-middleware client may reside on the computing device on which programs A and B reside to allow interaction with the messaging-middleware component 210.

The sending and receiving queues within the messaging-middleware component 210 are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is preset, but the current queue depth attribute changes based on the number of messages in the queue. Throughout this disclosure, preset attributes will be associated with settings, and attributes that are based on queue conditions are associated with attribute values. The primary attribute settings and values that are involved in embodiments of the present invention include an incoming value, an outgoing value, and a reset-time-interval setting. Many other attributes may be used to describe a queue and may be accessed or modified in embodiments of the present invention.

The above-mentioned attributes and settings are related to the amount of information or data entering and leaving a queue. The amount of information entering or leaving a queue may be measured in a variety of units of measure including the number of messages or bytes of data. Throughout this description, the amount of information will be described in terms of messages, but the invention is not intended to be limited to measuring the information entering and leaving a queue. A queue has a limited information capacity, which may be referred to as the maximum queue depth. The maximum allowable depth setting is the maximum amount of information the queue can hold before incoming messages are turned away. The current depth value is the current amount of information in the queue.

The incoming value is the amount of messages that have entered the queue since a reset period. Once the time period is reset, the incoming value is reset to zero and increases with each message that enters the queue. The outgoing value is the amount of messages that have exited the queue since the reset period. The reset time interval value is the time period after which the incoming value and the outgoing value are reset. In one embodiment, the incoming value is called the enqueue rate and the outgoing value is called the dequeue rate.

Monitoring component 220 is configured to monitor messaging-middleware objects (e.g., channels, application instances, and queues) to detect problems affecting the objects that may require corrective actions. A problem with a queue could indicate that a component associated with the queue is malfunctioning or the queue itself is malfunctioning. Examples of commercially available monitoring components include HP Openview®, queue Pasa!® by MQSoftware, Candle's PathWAI, and BMC Patrol. The monitoring component 220 may retrieve, store, and evaluate queue values periodically to ascertain whether a problem is present. For example, the current depth of the queue could be retrieved periodically. Having retrieved an attribute value, the attribute value is then evaluated against threshold values within the monitoring component 220, such as a high-depth threshold setting for a particular queue. The monitoring component 220 would then generate an alarm if the current queue depth exceeds the high-depth threshold value.

The monitoring component 220 is also configured to generate and transmit notifications describing problems associated with a queue. In one embodiment, the notification is transmitted to enterprise response component 230. In another embodiment, the monitoring component 220 directly notifies a designated responder about the alarm condition.

Enterprise response component 230 is configured to coordinate a response to malfunctions associated with a queue. The enterprise response component 230 may receive information regarding problems from the monitoring component 220 or another source. Upon receiving a notification, the enterprise response component 230 may page a designated responder to investigate the alarm condition. A designated responder may be an individual person or group of people given responsibility to fix malfunctions associated with assigned queues. In another embodiment, the designated responder may be a computer application that takes corrective actions.

The application-performance component 240 is configured for calculating a normal performance for an application instance. The application-performance component 240 may also monitor the present performance of an application instance and determine if an upset condition exists. The application-performance component 240 may work with monitoring component 220 and other components to gather data.

The application-performance component 240 of the present invention detects problems in an application instance. The problems may be described herein as an upset condition. The application instances are responsible for communicating messages accumulating within a queue to a destination. The destination may be a computer application, another queue, or some other computing component. In one embodiment, the queue and application instances are part of a messaging-middleware environment.

Embodiments of the present invention monitor the performance of individual application instances and detect an upset condition by comparing the present performance with a baseline performance or normal performance range. The application instance's message transfer rate may be used to measure performance.

Initially, a normal performance range is determined. The normal performance range may be determined for an individual application instance by analyzing the performance of the individual application instance over time during normal conditions. As mentioned, one measure of performance is the amount of messages communicated during a unit of time. For example, the messages communicated per second could be used as a measure of performance. Thus, the baseline or normal range could be an average transfer rate for the application instance measured over time.

In one embodiment, the performance of multiple application instances is measured to determine a normal performance for the application instance. In some embodiments, queues will have multiple application instances communicating messages from the queue to a destination(s). Each application instance is a copy of the same software program or code. Each instance may have its own identification information, but perform the same function.

The data store 250 is configured for storing information related to a queue. Information such as the incoming value, the outgoing value, the current depth, and other queue attributes including queue identification information may be stored. Similarly, the performance of individual application instances or groups of application instances may be stored. Alarms and determinations of upset conditions, along with records of any remedial actions taken in response, may be stored.

Figure 3:
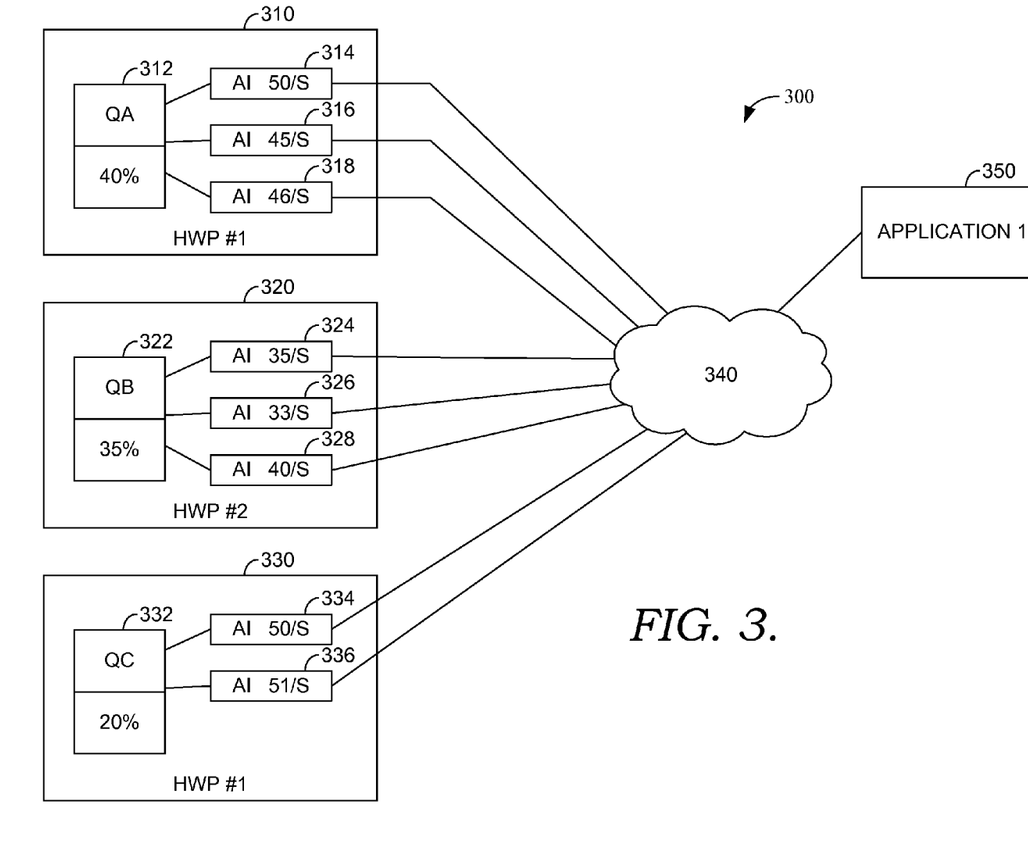
FIG. 3 is a drawing showing the normal performance of an application instance, in accordance with an embodiment of the present invention.

Turning now to FIG. 3, a messaging-middleware environment 300 illustrating normal performance of application instances is shown, in accordance with an embodiment of the present invention. The messaging-middleware environment 300 comprises machine 310, machine 320, and machine 330 all connected to application 1 350 through network 340. The machines may be real machines, such as a server, or virtual machines. Machine 310 hosts queue A 312, which is presently at 40% capacity. Queue A 312 has three application instances running. Application instance 314 is communicating 50 messages per second, application instance 316 is communicating 45 messages per second, and application instance 318 is communicating 46 messages per second. Each application instance communicates messages from queue A 312 to application 1 350. A limited number of queues and application instances are shown for the sake of simplicity. An actual implementation may include thousands of queues each having hundreds or thousands of application instances.

Each machine has a computing profile that describes the machine's hardware and versions of software running on the machine. Machine 310 fits computing profile number 1. Machine 320 fits computing profile number 2. Machine 330 fits computing profile number 1. The computing profile may be a category of machine that is defined by a range of different parameters. Differences may exist between machines that fit into the same computing profile. For example, the computing profile may include computers having a range of processing capacity.

The machine 320 includes queue B 322, which is at 35% capacity. Queue B 322 is associated with three active application instances. Application instance 324 is communicating 35 message per second. Application instance 326 is communicating 33 messages per second. Application instance 328 is communicating 40 messages per second.

Machine 330 hosts queue C 332, which is at 20% capacity. Queue C 332 is associated with two application instances. Application instance 334 communicates 50 messages per second and application instance 336 communicates 51 messages per second.

As mentioned, there are different ways to determine the normal performance of an individual application instance. FIG. 3 is intended to show a range of performances under normal conditions.

One way of determining a normal condition is to observe the performance of an individual application instance. For example, if application instance 314 maintains a throughput of 50 messages per second over a period of time, then the normal range for application instance 314 may be set at 50 messages per second. Application instance 316 may be given a normal performance of 45 messages per second if that rate is sustained over time. In this way, each application instance may have its own normal performance or normal performance range.

In another embodiment, the performance of multiple application instances operating under similar conditions is observed and averaged to form a normal performance parameter, or range. For example, the average message throughput of application instances 314, 316, and 318 over time may be 47 messages per second. Thus, the normal performance for application instances similar to those running on machine 310 could be 47 messages per second. The average transfer rate for application instances on machine 320 may be closer to 36 or 37 messages per second. This could be explained by the different computing profile on which the application instances of machine 320 are running.

In another embodiment, the performance of application instances across multiple machines having the same computing profile may be analyzed to determine a normal performance. For example, the performance of application instances 314, 316, 318, 334, and 336 could be evaluated to determine the expected or normal performance of an application instance running on a machine fitting computing profile number 1.

Regardless of the method used, a normal performance is assigned to individual application instances.

Figure 4:
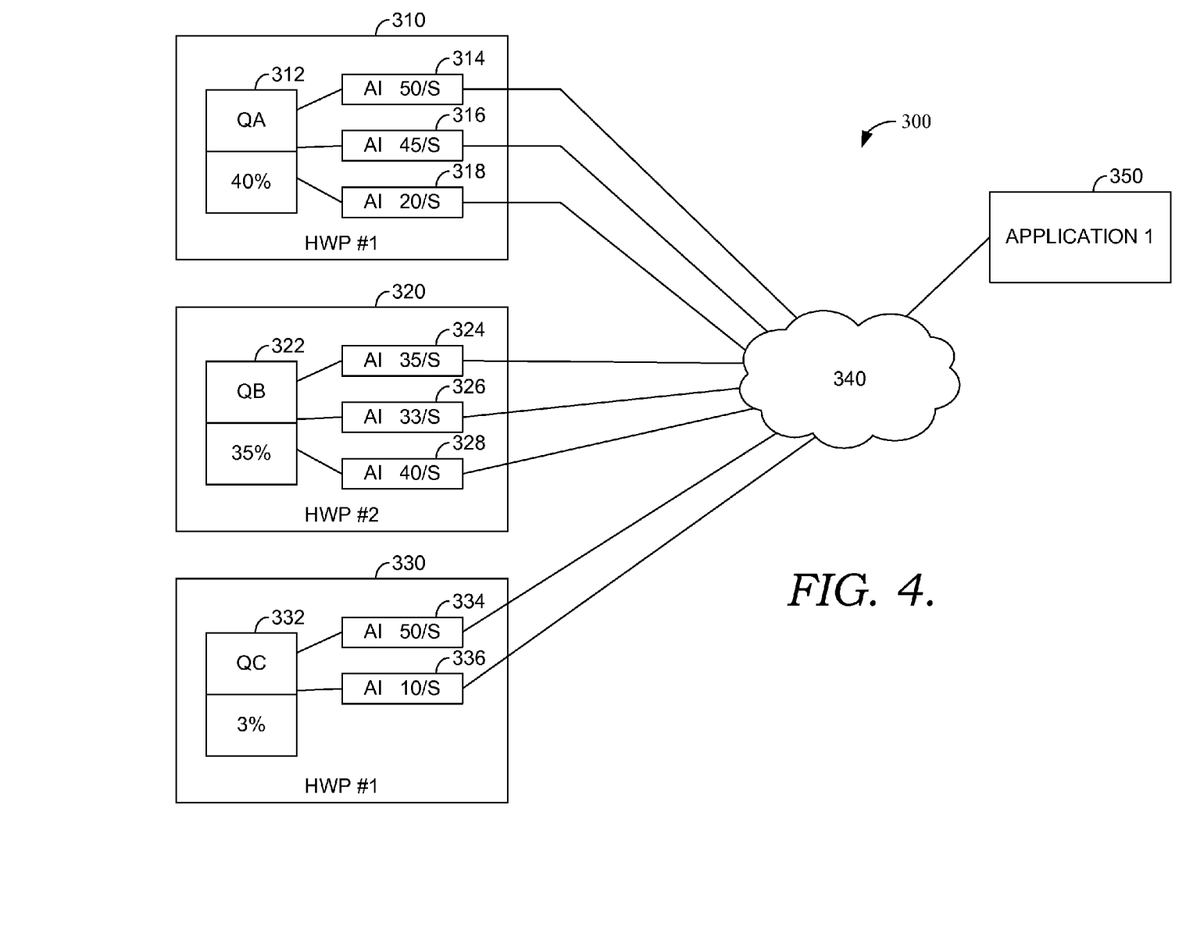
FIG. 4 is a drawing showing the abnormal performance of an application instance, in accordance with an embodiment of the present invention.

Turning now to FIG. 4, the abnormal performance of an application instance is shown, in accordance with an embodiment of the present invention. The components of FIG. 4 have been described previously with reference to FIG. 3. Only the transmission rate of some application instances has changed. For the sake of illustration, the normal performance of application instances running on a machine conforming to computing profile number 1 is determined to be between 47 and 50 messages per second. As can be seen, the performance of application instance 316 is 45 messages per second, which is below the expected range. The performance of application instance 318 is further below the expected range at 20 messages per second. The performance of application instances running on machine 320 are the same as those mentioned previously with reference to FIG. 3. As mentioned previously, the application instance's expected performance for computing profile 2 may be different from that for computing profile number 1. The performance of application instance 336 is 10 messages per second.

In one embodiment, an upset condition is triggered for application instance 318, but not 316 because application instance 318 falls outside of the normal range by more than a designated threshold. In other words, application instance 316 falls two messages per second below the expected range, but if the threshold is five messages per second, then an upset condition would not be determined for application instance 316. However, the observed transmission rate of 20 messages per second within application instance 318 falls below the expected performance range by 27 messages per second. Accordingly, an upset condition is detected.

Upon determining if the upset condition exists, the queue depth of queue A 312 may be determined to ascertain whether messages are available to be transferred. In this case, the queue depth is at 40% and messages are available to be transferred. Additionally, the other application instances associated with queue A 312 do not appear to be in upset condition. Accordingly, an alarm may be generated for application instance 318 and communicated to a designated responder to take remedial action or investigate the cause of the upset condition in application instance 318.

Application instance 336 is also below a threshold from the normal operating parameter. In this case, the queue depth for queue C 332 is determined to be 3%. This may indicate that there are not messages available to be communicated by application instance 336. In this case, an alarm is not sent. In one embodiment, a note of the alarm may be saved for later communication to a designated responder, but no additional immediate action is taken. If the message transmission rate increases back to normal range before action is taken, then the upset condition may be cancelled and an all clear message is sent to the designated responder, if an alarm had been sent previously.

Figure 5:
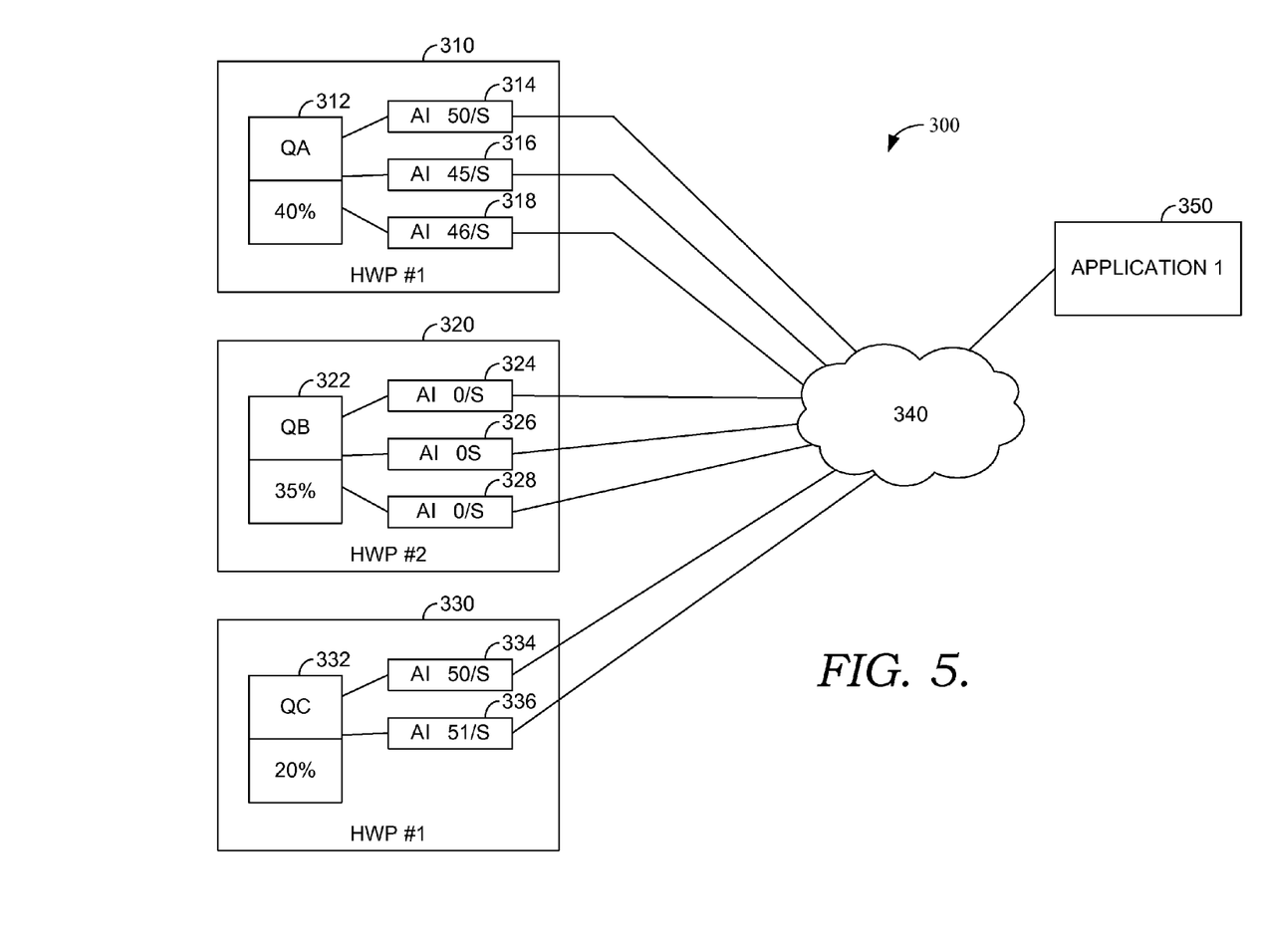
FIG. 5 is a drawing showing the abnormal performance of an application instance, in accordance with an embodiment of the present invention.

Turning now to FIG. 5, an upset condition within a messaging-middleware environment 300 is illustrated, in accordance with an embodiment of the present invention. The messaging-middleware environment comprises components described previously with reference to FIG. 3. However, the transmission rate of application instances 324, 326, and 328 have all turned to zero messages per second. Zero messages per second is more than a threshold away from the normal message transmission rate. In this instance, the queue depth within queue B 322 is 35%. This indicates that there are messages available for transfer.

However, all of the application instances associated with queue B 322 are indicating an upset condition. This may indicate that there is a problem with the channel, network 340, receiving application 350, or some other network component. A problem with those other components may indicate that there is no problem with the individual application instances. Either way, an alarm may be communicated under certain circumstances to indicate that there is a problem detected by the application instances not communicating messages or communicating below a threshold amount of messages.

Figure 6:
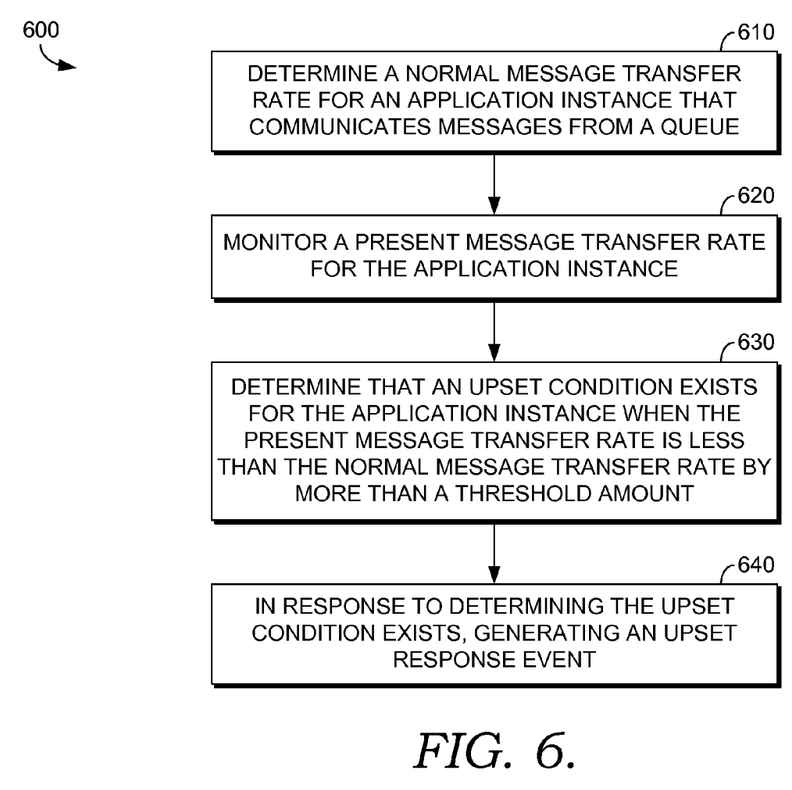
FIG. 6 is a flow diagram in which a method of detecting a malfunction in an application responsible for withdrawal of messages from a queue is described according to an embodiment of the present invention.

Turning now to FIG. 6, a method 600 of detecting a malfunction in an application responsible for withdrawal of messages from a queue is shown, in accordance with an embodiment of the present invention. The queue may be a part of a messaging-middleware environment. At step 610, a normal message transfer rate is determined for an application instance that communicates messages from a queue. Different ways of determining a normal message transfer rate are possible. These methods include taking an average rate based on observations of an individual application instance, taking an average rate from a group of similar application instances, and using a theoretical maximum transfer rate achievable by the application instance. For example, the normal message transfer rate could be 80% of the maximum theoretical transfer rate.

The normal rate may be determined by measuring the message throughput of the queue and dividing the throughput by the number of active application instances during that time period. Thus, if a hundred messages were communicated through the queue within a second, and five application instances were running, then the average transfer rate would be 20 messages per second for an individual application instance. Monitoring the queue throughput eliminates the need to monitor the individual application instances for the purpose of establishing a normal performance.

A range of normal transfer rates may be established by analyzing the performance of the application instances or the queue throughput over different periods of time. In addition, the normal range should take into account the role of the individual application instance that is being analyzed. Different application instances may play a different role, especially within a load-balancing regime. If the load-balancing regime attempts to evenly distribute message communication duties between the application instances, then the performance of each should be similar. On the other hand, if some application instances have preference within the load balancing algorithm, then the preferences need to be considered when determining the normal range for each instance. For example, one of the application instances could be on standby and only used to handle an overflow that the other active application instances are not able to handle. Then for that one application instance, the throughput could be much lower than that of the others even though there is no upset condition or abnormality. Thus, the normal range may differ for application instances associated with a particular queue or with different queues. In one embodiment, buffer application instances are only monitored when a queue depth reaches a level where the application instance should be operating at normal capacity.

Additionally, the hardware on which the application instance is running may affect the performance of the application instance. Thus, different normal performance parameters may be established for different hardware and software profiles for the real or virtual machine on which the application instance is running. In one embodiment, a series of normal performance ranges is established for application instances in different roles and on different devices.

Once a normal threshold range is determined for a particular application instance, the performance of that application instance is monitored and compared to the normal performance. When the performance of the application instance falls below the normal range, then a response event is initiated. Different response events will be described subsequently.

In one embodiment, the normal condition is expressed as a range. In another embodiment, the normal performance is expressed as an individual rate. If expressed as a range, any number inside the range may be normal and a throughput rate for the application instance outside the range may be considered abnormal. However, an additional threshold may be added to the range to avoid false alarms. For example, the transfer rate may need to fall below the normal range for more than a threshold amount of time before an alarm is sounded or an upset event is initiated. When the transfer rate is slightly below the operating range, then no upset event is generated. Once the throughput rate falls below the threshold from the operating range, then the upset condition is generated.

The threshold and/or normal range may be statistically derived as a standard deviation away from the normal condition or two standard deviations or whatever is suitable for the particular application.

At step 620, a present message transfer rate for the application instance is monitored. At step 630, an upset condition is determined to exist for the application instance when the present message transfer rate is less than the normal message transfer rate by more than a threshold amount. As mentioned, the threshold amount may be calculated based on the variability or frequency with which the transfer rate fluctuates away from the normal message transfer rate.

At step 640, an upset response event is generated in response to determining that the upset condition exists. A response event may be an alarm or various troubleshooting steps to resolve the upset condition or determine whether an alarm needs to be sent. For example, the queue depth could be checked to determine whether there are messages to communicate from the queue in the first place. Other network conditions could be observed to detect malfunctions within the network that could cause a low transfer rate through the application instance without there being a problem with the individual application instance.

Figure 7:
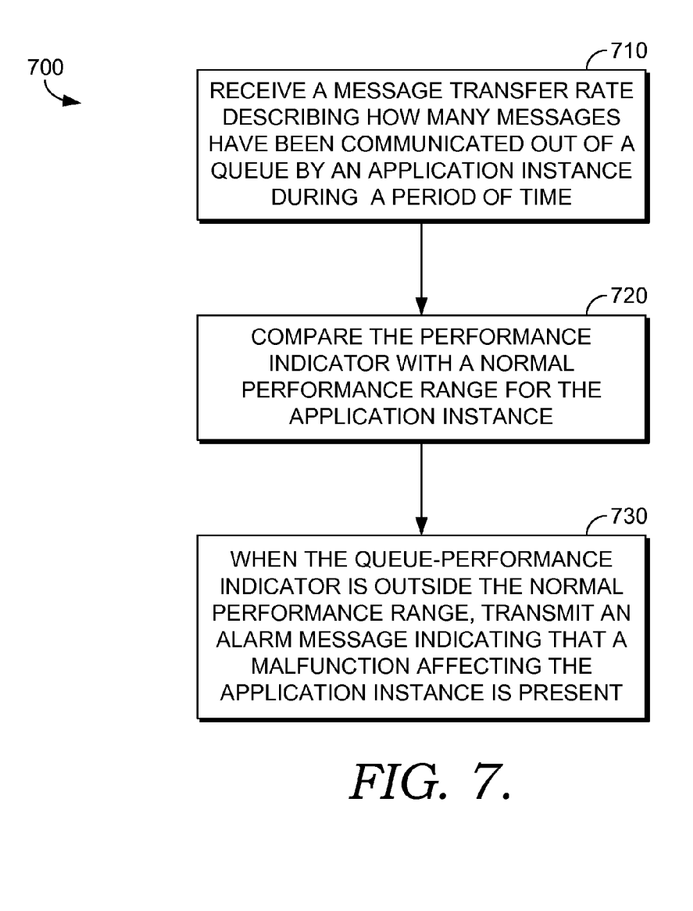
FIG. 7 is a flow diagram in which a method of detecting a malfunction in an application responsible for withdrawal of messages from a queue is described according to an embodiment of the present invention.

Turning now to FIG. 7, a method 700 of detecting a malfunction in an application responsible for withdrawal of messages from a queue is shown, in accordance with an embodiment of the present invention. At step 710, a message transfer rate describing how many messages have been communicated out of the queue by an application instance during a period of time is received. The message transfer rate may be received by a monitoring device. In one embodiment, the message transfer rate is detected by the messaging-middleware software.

At step 710, the message transfer rate is compared with a normal performance range for the application instance. At step 730, an alarm message indicating that a malfunction affecting the application instance is present is transmitted when the message transfer rate is outside the normal performance range.

Figure 8:
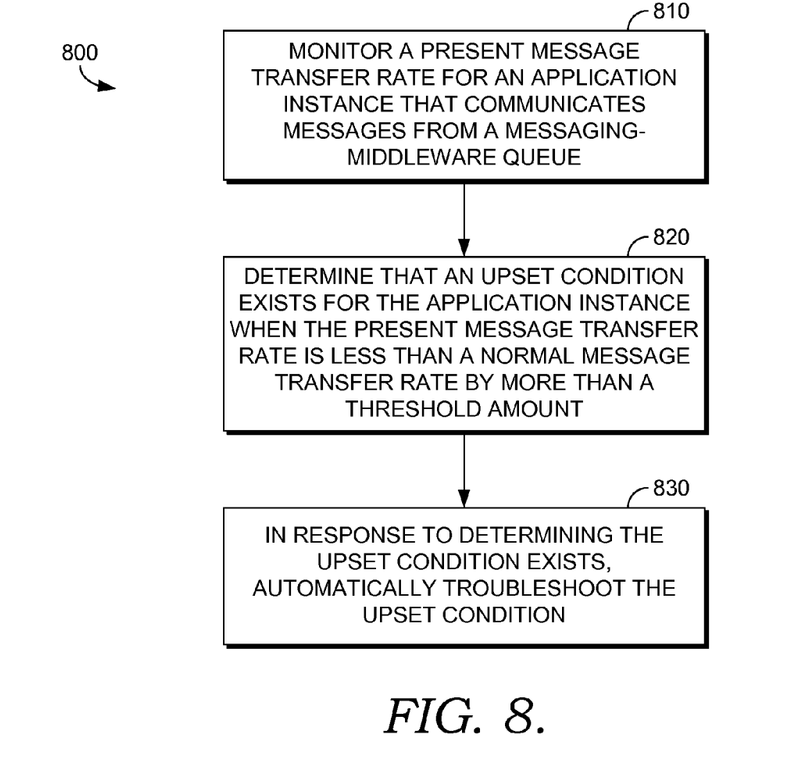
FIG. 8 is a flow diagram in which a method of detecting a malfunction in an application responsible for withdrawal of messages from a queue is described according to an embodiment of the present invention.

Turning now to FIG. 8, a method 800 of detecting a malfunction in an application responsible for withdrawal of messages from a queue is shown, in accordance with an embodiment of the present invention. At step 810, a present message transfer rate for an application instance that communicates messages from a messaging-middleware queue is monitored. At step 820, an upset condition is determined to exist for the application instance. The upset condition exists when the present message transfer rate is less than a normal message transfer rate by more than a threshold amount. This may be described as outside of a normal message transfer range. In one embodiment, the normal transfer rate is determined by analyzing performance of the application instance during normal conditions. Other methods of determining normal message transfer rate are possible.

At step 830, the upset condition is automatically troubleshot in response to determining if the upset condition exists. The troubleshooting may attempt to eliminate potential causes of the upset condition and fix them where possible. Conditions that may be eliminated include a queue depth below a threshold, indicating that the low transfer rate results from a lack of messages to be communicated. Other network parameters may be evaluated to determine whether the low transfer rate is caused by something other than a malfunction within the application instance.

The upset event may trigger a search for the cause for the low throughput rate observed within an application instance. For example, the queue depth from which the application instance is pulling messages may be evaluated. If the queue depth is below a threshold, then the cause of the low throughput through the application instance may be the lack of available messages to communicate in the first place. In this case, the upset event may be terminated. In the alternative, an application that balances or controls the number of actively running application instances may be informed about the upset event. That application may shut down application instances associated with a queue if they are deemed unnecessary at the moment. The same application could activate additional application instances in the future if needed.

In another embodiment, the status of other application instances communicating messages from the queue is evaluated. If the other application instances are also in an upset condition, that could indicate a problem with the queue, the downstream communication channels, or a receiving application, etc. When all of the application instances are failing or in an upset condition, there is less likely to be a problem with an individual application instance. Further, other alarm parameters for those features may have been tripped. Nevertheless, in this situation, an alarm message may be generated that indicates a widespread problem. The alarm could be sent to an application that alerts designated responders for troubleshooting.

Many different arrangements of the various components depicted, as well as components not shown, are possible without departing from the spirit and scope of the present invention. Embodiments of the present invention have been described with the intent to be illustrative rather than restrictive. It will be understood that certain features and subcombinations are of utility and may be employed without reference to other features and subcombinations and are contemplated within the scope of the claims.

The invention claimed is:

1. One or more non-transitory computer-readable media having computer-executable instructions embodied thereon for performing a method of detecting a malfunction in an application responsible for withdrawal of messages from a queue, the method comprising;
    determining a normal message transfer rate for an application instance that communicates messages from a queue wherein the normal message transfer rate is determined by dividing a quantity of messages withdrawn from the queue during a testing period by an amount of time comprising the testing period to obtain an outgoing message withdrawal rate and further dividing the outgoing message withdrawal rate by a number of active application instances;
    monitoring a present message transfer rate for the application instance;
    determining that an upset condition exists for the application instance when the present message transfer rate is less than the normal message transfer rate by more than a threshold amount; and
    in response to said determining the upset condition exists, generating an upset response event.

2. The media of claim 1, wherein the upset response event is transmitting an alarm message to a designated responder.

3. The media of claim 1, wherein the upset response event comprises checking queue depth to determine whether a lack of messages within the queue caused the upset condition.

4. The media of claim 3, wherein the upset response event further comprises automatically shutting down one or more application instances upon determining a queue depth is below a queue depth threshold.

5. The media of claim 1, wherein the upset response event comprises checking whether an upset condition has been generated for other active application instances communicating messages from the queue and taking no remedial action on the application instance when upset conditions have been generated for multiple active application instances.

6. The media of claim 1, wherein the queue is associated with a messaging-middleware application.

7. One or more non-transitory computer-readable media having computer-executable instructions embodied thereon for performing a method of detecting a malfunction in an application responsible for withdrawal of messages from a queue, the method comprising:
    determining a normal message transfer rate by dividing a quantity of messages withdrawn from the queue during a testing period by an amount of time comprising the testing period to obtain an outgoing message withdrawal rate and further dividing the outgoing message withdrawal rate by a number of active application instances;
    establishing a normal performance range around the normal transfer rate with a threshold number;

receiving a message transfer rate describing how many messages have been communicated out of a queue by the application instance during a period of time;

comparing the message transfer rate with the normal performance range for the application instance; and when the message transfer rate is outside the normal performance range, transmitting an alarm message indicating that a malfunction affecting the application instance is present.

8. The media of claim 7, wherein the threshold number is large enough to include within the normal performance range is a range of transfer rates achieved by the application instance during a period when the application instance is determined to be malfunction-free.

9. The media of claim 7, wherein the threshold number is large enough to include within the normal performance range a range of transfer rates expected for an application instance running on a computing device having a particular computing profile.

10. The media of claim 7, wherein the threshold number is large enough to include within the normal performance range an average individual range of transfer rates achieved by a group of application instances during a period when the group of application instances is determined to be malfunction-free.

11. The media of claim 7, wherein the message transfer rate is outside of the normal performance range when a difference is greater than the threshold number.

12. The media of claim 7, wherein the alarm message is transmitted to a component that contacts a designated responder who is responsible for components associated with the queue.

13. A method of detecting a malfunction in an application responsible for withdrawal of messages from a queue, the method comprising;

monitoring a present message transfer rate for an application instance that communicates messages from a messaging-middleware queue;

determining a normal message transfer rate by dividing a quantity of messages withdrawn from the queue during a testing period by an amount of time comprising the testing period to obtain an outgoing message withdrawal rate and further dividing the outgoing message withdrawal rate by a number of active application instances;

determining that an upset condition exists for the application instance when the present message transfer rate is less than the normal message transfer rate by more than a threshold amount; and in response to said determining the upset condition exists, automatically troubleshooting the upset condition.

14. The method of claim 13, wherein the troubleshooting comprises checking queue depth to determine whether a lack of messages within the queue caused the upset condition.

15. The method of claim 13, wherein the troubleshooting comprises checking whether an upset condition has been generated for other active application instances communicating messages from the queue and taking no remedial action on the application instance when upset conditions have been generated for multiple active application instances.

* * * * *